US012607913B2

(12) United States Patent (10) Patent No.: US 12,607,913 B2

Teruya et al. (45) Date of Patent: Apr. 21, 2026

(54) CAMERA ACCESSORY CAPABLE OF BEING ATTACHED TO OR DETACHED FROM IMAGE PICKUP APPARATUS MAIN BODY

(71) Applicant: CANON KABUSHIKI KAISHA, Tokyo (JP)

(72) Inventors: Yuko Teruya, Kanagawa (JP); Kenji Yamagata, Kanagawa (JP); Hayato Mano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 181 days.

(21) Appl. No.: 18/357,333

(22) Filed: Jul. 24, 2023

(65) Prior Publication Data

US 2024/0036442 A1 Feb. 1, 2024

(30) Foreign Application Priority Data

Jul. 28, 2022 (JP) ................................. 2022-120685

(51) Int. Cl.
G03B 17/56 (2021.01)

(52) U.S. Cl.
CPC ........ G03B 17/56 (2013.01); *G03B 2217/002* (2013.01)

(58) Field of Classification Search
CPC ... G03B 17/14; G03B 17/56; G03B 2217/002
See application file for complete search history.

(56) References Cited

U.S. PATENT DOCUMENTS

| | | | | |
|---|---|---|---|---|
| 6,873,367 | B1* | 3/2005 | Hirata | ................... H04N 1/2158 |
| | | | | 348/E5.025 |
| 8,199,251 | B2* | 6/2012 | Woodman | .............. G03B 17/56 |
| | | | | 348/81 |
| 11,526,069 | B2* | 12/2022 | Nakamura | ............. H04N 23/52 |
| 2010/0060747 | A1* | 3/2010 | Woodman | .............. H04N 23/51 |
| | | | | 348/222.1 |
| 2019/0277604 | A1* | 9/2019 | Ball | ....................... F41G 11/005 |
| 2021/0055632 | A1* | 2/2021 | Nakamura | ............. G03B 17/14 |
| 2021/0055637 | A1* | 2/2021 | Nakamura | ............. H04N 23/55 |

FOREIGN PATENT DOCUMENTS

JP 2021-034790 A 3/2021

* cited by examiner

*Primary Examiner* — Antoinette T Spinks

(74) *Attorney, Agent, or Firm* — Cowan, Liebowitz & Latman, P.C.

(57) ABSTRACT

A camera accessory capable of improving operability is provided. The camera accessory capable of being attached to or detached from an image pickup apparatus main body including an image pickup plane and a camera accessory attachment portion, includes a first connecting terminal configured to perform at least one input or output of video signals, operating power, and control signals with respect to the image pickup apparatus main body, and a second connecting terminal configured to perform at least one input or output of the video signals, the operating power, and the control signals with respect to the outside of the camera accessory. In a state, in which the camera accessory is attached to the camera accessory attachment portion, an expansion module attachment portion and an operation portion are arranged to be substantially parallel to the image pickup plane and are arranged on a surface opposite to the image pickup plane.

11 Claims, 17 Drawing Sheets

120

182

120b

120a

199

193

Y

X

181

193

199

Y

X

CAMERA ACCESSORY CAPABLE OF BEING ATTACHED TO OR DETACHED FROM IMAGE PICKUP APPARATUS MAIN BODY

BACKGROUND OF THE INVENTION

Field of the Invention

The present invention relates to a camera accessory that is configured to be attachable and detachable with respect to an image pickup apparatus main body of an image pickup system and is able to realize function expansion of the image pickup apparatus main body by connection.

Description of the Related Art

Image pickup systems that each includes an image pickup apparatus main body and a camera accessory capable of being attached to or detached from the image pickup apparatus main body have become popular.

In such an image pickup system, when one camera accessory selected from a plurality of kinds of camera accessories is attached to the image pickup apparatus main body, the function of the image pickup apparatus main body is expanded in response to the attached camera accessory (for example, see Japanese Laid-Open Patent Publication (kokai) No. 2021-34790).

In the case that all functions that are able to be expanded by attaching the camera accessories are equipped in the image pickup apparatus main body in advance instead of attaching the camera accessories, the product will become large and the operability during photographing will be greatly reduced. On the other hand, in such an image pickup system, since only the function desired by a user is able to be equipped in the product and the product is able to be miniaturized, the operability during photographing is improved.

However, in the case that the image pickup apparatus is placed on a tripod and the user operates a pan bar provided on the tripod to perform the photographing while he/she is behind the image pickup apparatus, as in studio photographing at a television station, the conventional camera accessory disclosed in Japanese Laid-Open Patent Publication (kokai) No. 2021-34790 has a problem of poor operability.

That is, in the conventional camera accessory disclosed in Japanese Laid-Open Patent Publication (kokai) No. 2021-34790, in the case that an operation surface of the conventional camera accessory is disposed on substantially the same surface as a side surface of the image pickup apparatus and the user is operating the image pickup apparatus from behind, the user is required to move to the side of the image pickup apparatus to perform key operations.

SUMMARY OF THE INVENTION

The present invention provides a camera accessory that is configured to be attachable and detachable with respect to an image pickup apparatus main body of an image pickup system, realizes function expansion of the image pickup apparatus main body by connection, and is capable of improving the operability of key operations performed with respect to its operation surface.

Accordingly, the present invention provides a camera accessory capable of being attached to or detached from an image pickup apparatus main body including an image pickup plane and a camera accessory attachment portion, the camera accessory comprising a first connecting terminal configured to perform at least one input or output of video signals, operating power, and control signals with respect to the image pickup apparatus main body, and a second connecting terminal configured to perform at least one input or output of the video signals, the operating power, and the control signals with respect to the outside of the camera accessory. In a state, in which the camera accessory is attached to the camera accessory attachment portion, an expansion module attachment portion for attaching an expansion module and an operation portion are arranged to be substantially parallel to the image pickup plane and are arranged on a surface opposite to the image pickup plane of the image pickup apparatus main body.

Accordingly, the present invention provides a camera accessory capable of being attached to or detached from an image pickup apparatus main body including an image pickup plane, a camera accessory attachment portion, and a main body side operation portion provided on a surface opposite to the image pickup plane, the camera accessory comprising a first connecting terminal configured to perform at least one input or output of video signals, operating power, and control signals with respect to the image pickup apparatus main body, a second connecting terminal configured to perform at least one input or output of the video signals, the operating power, and the control signals with respect to the outside of the camera accessory, and an operation portion. In a state, in which the camera accessory is attached to the camera accessory attachment portion, at least a portion of the operation portion is arranged at a position that overlaps the main body side operation portion substantially on a projection plane on an optical axis of the image pickup apparatus main body.

According to the present invention, it becomes possible to provide the camera accessory that is configured to be attachable and detachable with respect to the image pickup apparatus main body of the image pickup system, realizes the function expansion of the image pickup apparatus main body by connection, and is capable of improving the operability of key operations performed with respect to its operation surface.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
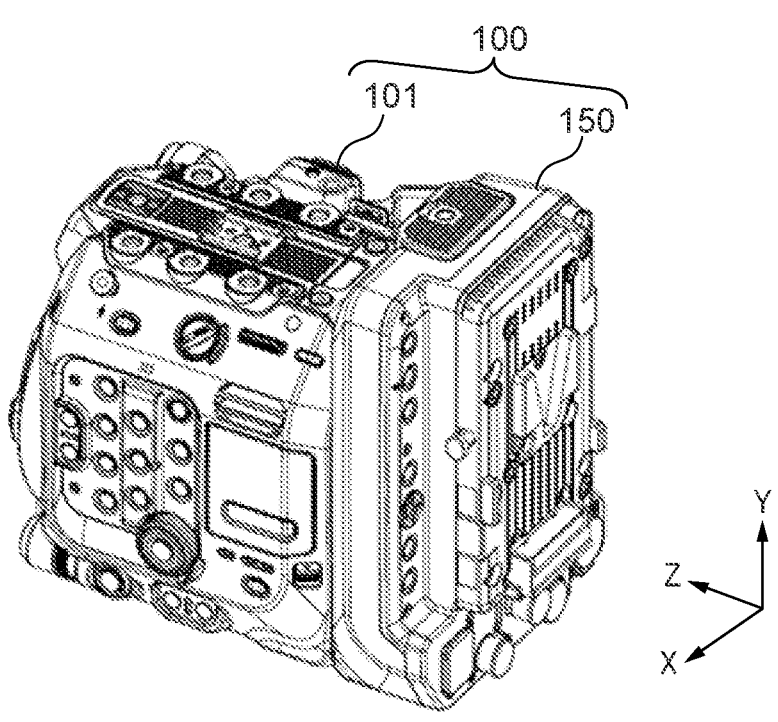
FIGS. 1A and 1B are perspective views that show an external appearance of an image pickup system according to a preferred embodiment of the present invention.
Figure 1B:
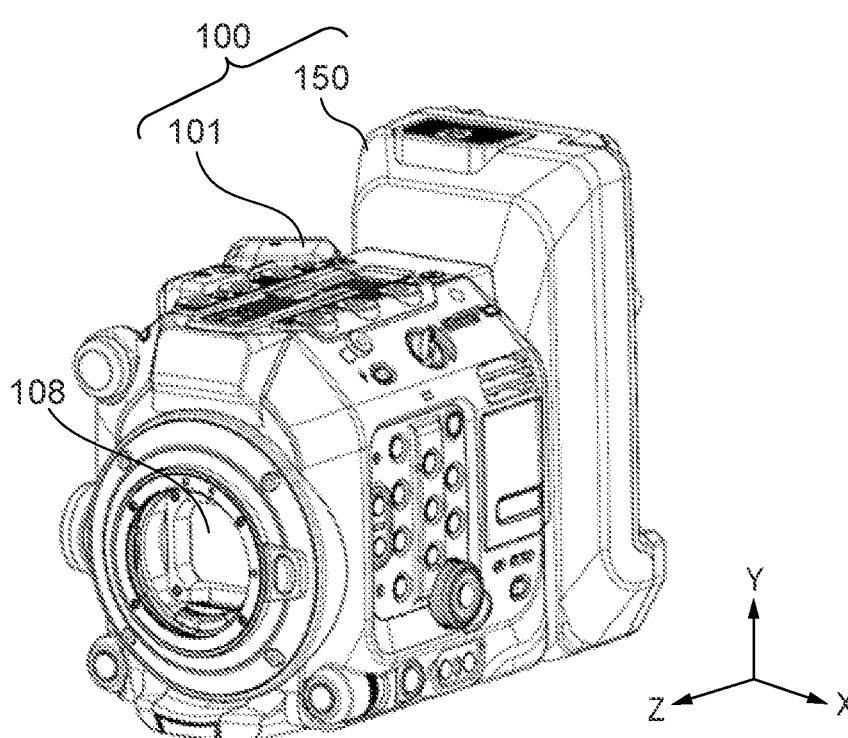
Figure 2:
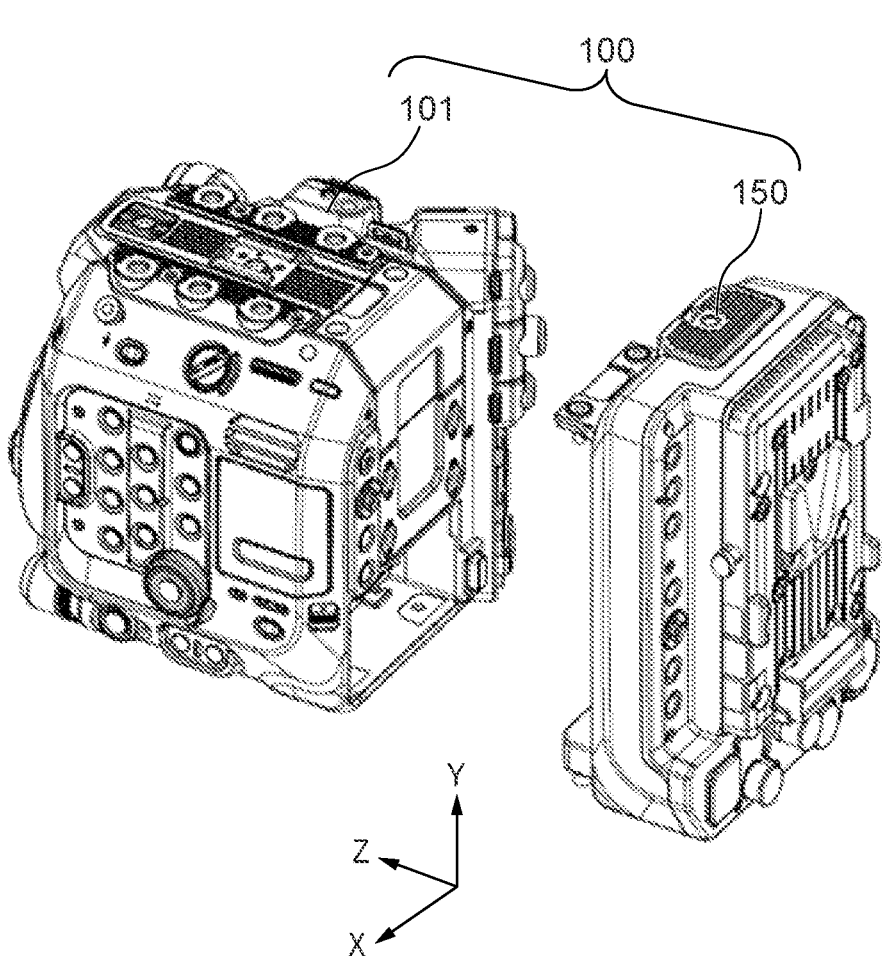
FIG. 2 is a perspective view that shows separately an image pickup apparatus main body and an expansion unit capable of being attached to or detached from the image pickup apparatus main body, which constitute the image pickup system shown in FIGS. 1A and 1B.

FIGS. 1A and 1B are perspective views that show an external appearance of an image pickup system 100 according to a preferred embodiment of the present invention. Further, FIG. 2 is a perspective view that shows separately an image pickup apparatus main body 101 and an expansion unit 150 capable of being attached to or detached from the image pickup apparatus main body 101, which constitute the image pickup system 100.

Moreover, in order to clarify the correspondence between drawings in the image pickup system 100, as shown in FIGS. 1A and 1B, coordinate axes (an X-axis, a Y-axis, and a Z-axis), which are orthogonal to each other, are set. The Z-axis is an axis that represents a front-rear direction of the image pickup apparatus main body 101 and is a direction perpendicular to an image pickup plane 108 (see FIG. 1B), and a direction from the rear side of the image pickup apparatus main body 101 to the front side of the image pickup apparatus main body 101 is defined as a plus direction of the Z-axis (a plus Z-axis direction). Further, the Y-axis is an axis that represents a vertical direction of the image pickup apparatus main body 101, and a direction from the lower side of the image pickup apparatus main body 101 to the upper side of the image pickup apparatus main body 101 is defined as a plus direction of the Y-axis (a plus Y-axis direction). Moreover, the X-axis is an axis that represents a left-right direction of the image pickup apparatus main body 101, and a direction from the left side of the image pickup apparatus main body 101 to the right side of the image pickup apparatus main body 101 when viewed from the front side of the image pickup apparatus main body 101 is defined as a plus direction of the X-axis (a plus X-axis direction). The directions of respective coordinate axes (the X-axis, the Y-axis, and the Z-axis) defined in this manner will be used in the description as appropriate.

The expansion unit 150 includes a connecting means (not shown) for the image pickup apparatus main body 101, is electrically connectable to the image pickup apparatus main body 101, and supplies electric power to the image pickup apparatus main body 101.

First, the configuration of the image pickup apparatus main body 101 will be described by using FIGS. 3 and 4.

Figure 3:
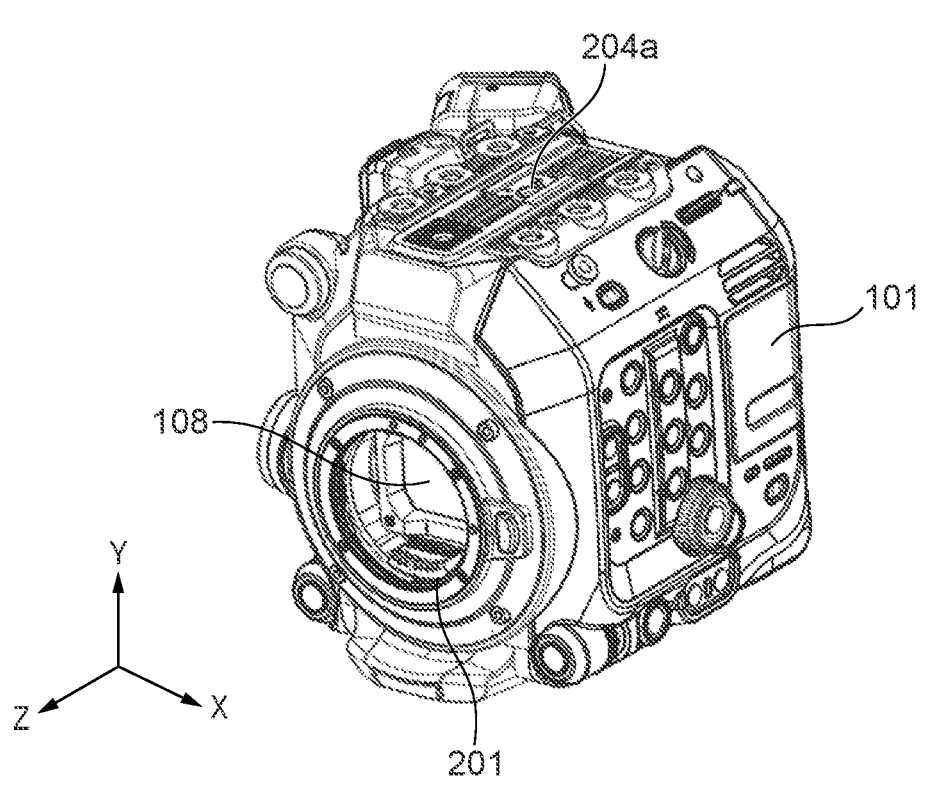
FIG. 3 is a perspective view of the image pickup apparatus main body when viewed from the front upper side.

FIG. 3 is a perspective view of the image pickup apparatus main body 101 when viewed from the front upper side. Further, FIG. 4 is a perspective view of the image pickup apparatus main body 101 when viewed from the rear upper side.

As shown in FIG. 3, the image pickup apparatus main body 101 includes a lens attachment portion 201 on its front surface. The lens attachment portion 201 is provided with a contact portion (not shown) that allows various types of interchangeable lenses with different optical performance to be detachable from or attachable to the image pickup apparatus main body 101, and an optical image is formed on the image pickup plane 108 by the attached interchangeable lens among various types of interchangeable lenses. An image pickup element (not shown) for outputting image signals based on the formed optical image is disposed on the image pickup plane 108. Furthermore, the image pickup apparatus main body 101 includes a control board (not shown), which controls the entire image pickup system 100, and a signal processing board (not shown), which generates video data based on the image signals outputted from the image pickup element, inside.

Figure 4:
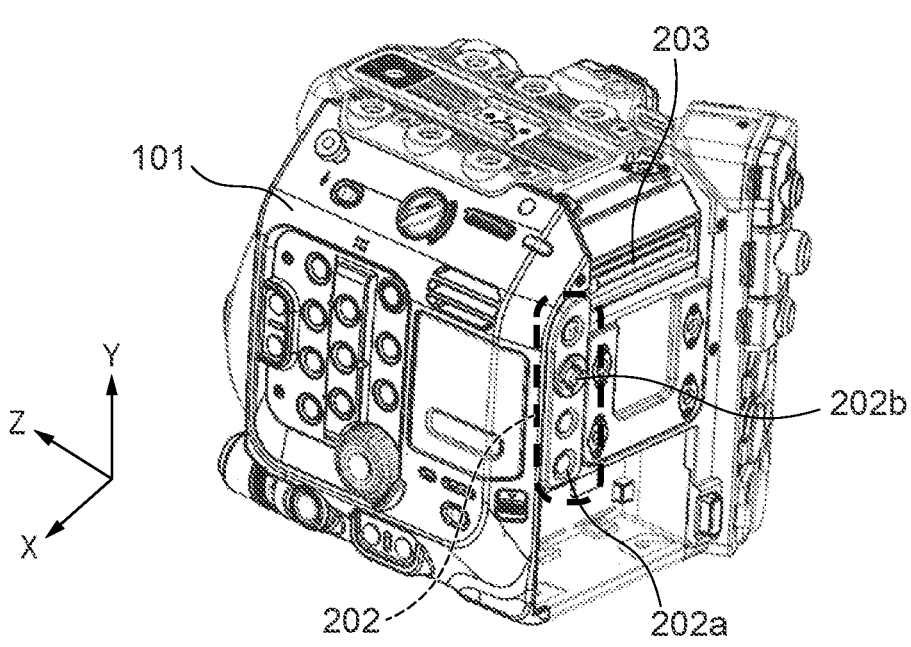
FIG. 4 is a perspective view of the image pickup apparatus main body when viewed from the rear upper side.

As shown in FIG. 4, a main body rear operation portion 202 and an expansion unit connecting connector 203 (a camera accessory attachment portion) are provided on the rear surface of the image pickup apparatus main body 101. Furthermore, as shown in FIG. 3, a monitor attachment portion 204a, which becomes a contact portion that allows a monitor 204 described below with reference to FIG. 12 to be detachable from or attachable to the image pickup apparatus main body 101, is provided on the top surface of the image pickup apparatus main body 101.

The main body rear operation portion 202 is a menu-related operation portion, in which a plurality of operation switches are disposed on the same plane, and includes a main body side menu button 202a and a main body side cross key 202b. A user is able to access a menu mode for performing various kinds of settings of the image pickup apparatus main body 101 by operating the main body side menu button 202a. In addition, by operating the main body side cross key 202b, the user is able to perform moving to select an item in the menu mode and make a selection decision by center push.

In addition, many users perform menu operations of the image pickup system 100 while looking at the monitor 204 attached to the monitor attachment portion 204a. At this time, as shown in FIGS. 1A and 1B, the monitor 204 faces the rear side of the image pickup system 100. Therefore, in the case that the user performs the menu operation while looking at the monitor 204, since the left-right direction and the vertical direction (the X-axis direction and the Y-axis direction) of the main body side cross key 202b of the main body rear operation portion 202 coincide with the left-right direction and the vertical direction of the monitor 204, the user is able to perform the operation intuitively.

The expansion unit connecting connector 203 (a first connecting terminal) is a terminal that can electrically connect the expansion unit 150 and the image pickup apparatus main body 101 via a contact connector 190 of the expansion unit 150 described below with reference to FIG.

7. In addition, the expansion unit connecting connector 203 is disposed to be exposed toward the rear (a minus Z-axis direction) from the image pickup apparatus main body 101. When the expansion unit 150 and the image pickup apparatus main body 101 are connected, bidirectional transfer of video signals, control signals of the image pickup system 100, operating power, etc., which are communicated through various kinds of plugs connected to a terminal group 199 (a second connecting terminal, see FIG. 6) of the expansion unit 150, becomes possible between the expansion unit 150 and the image pickup apparatus main body 101.

Next, the configuration of the expansion unit 150 according to the preferred embodiment of the present invention will be described.

Figure 5:
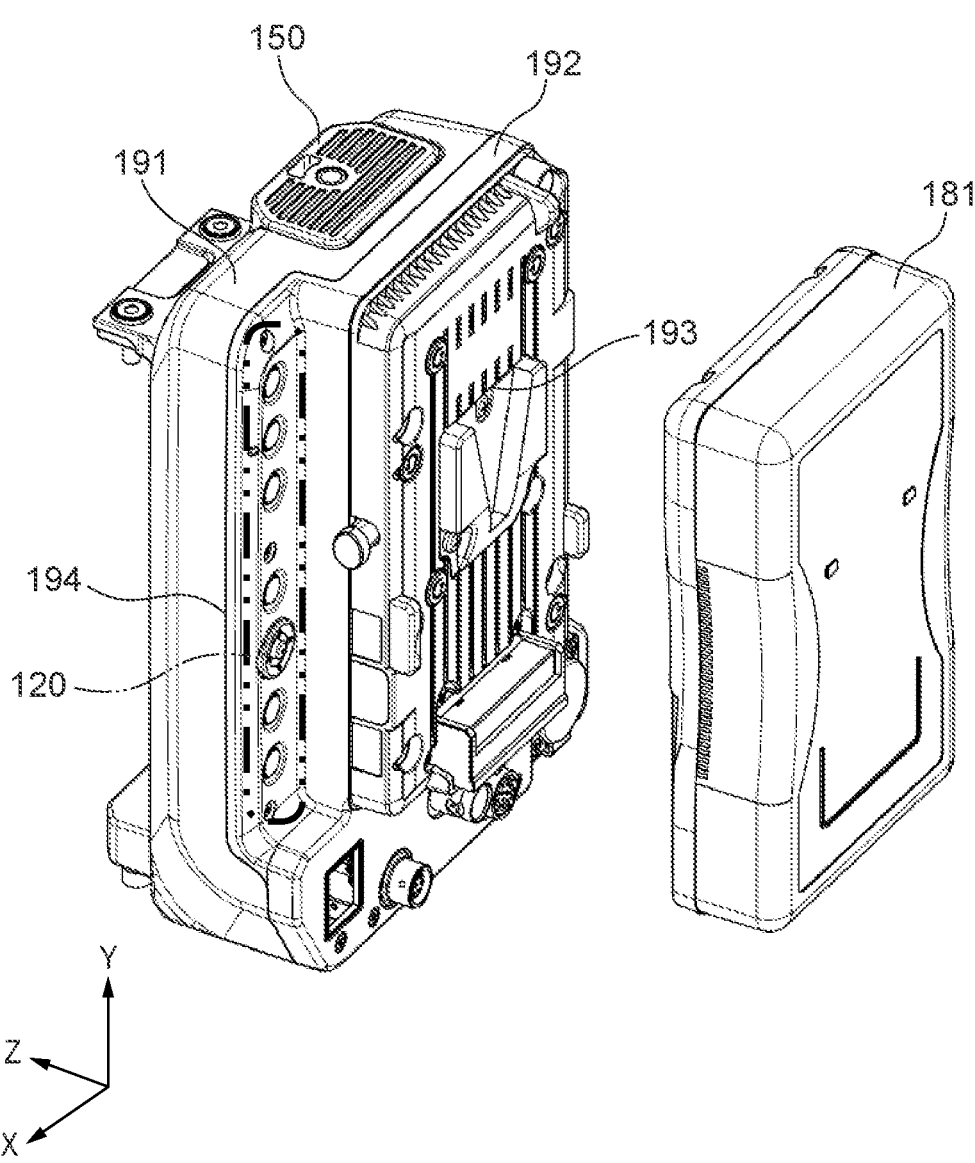
FIG. 5 is a perspective view of the expansion unit when viewed from the rear upper side.
Figure 6:
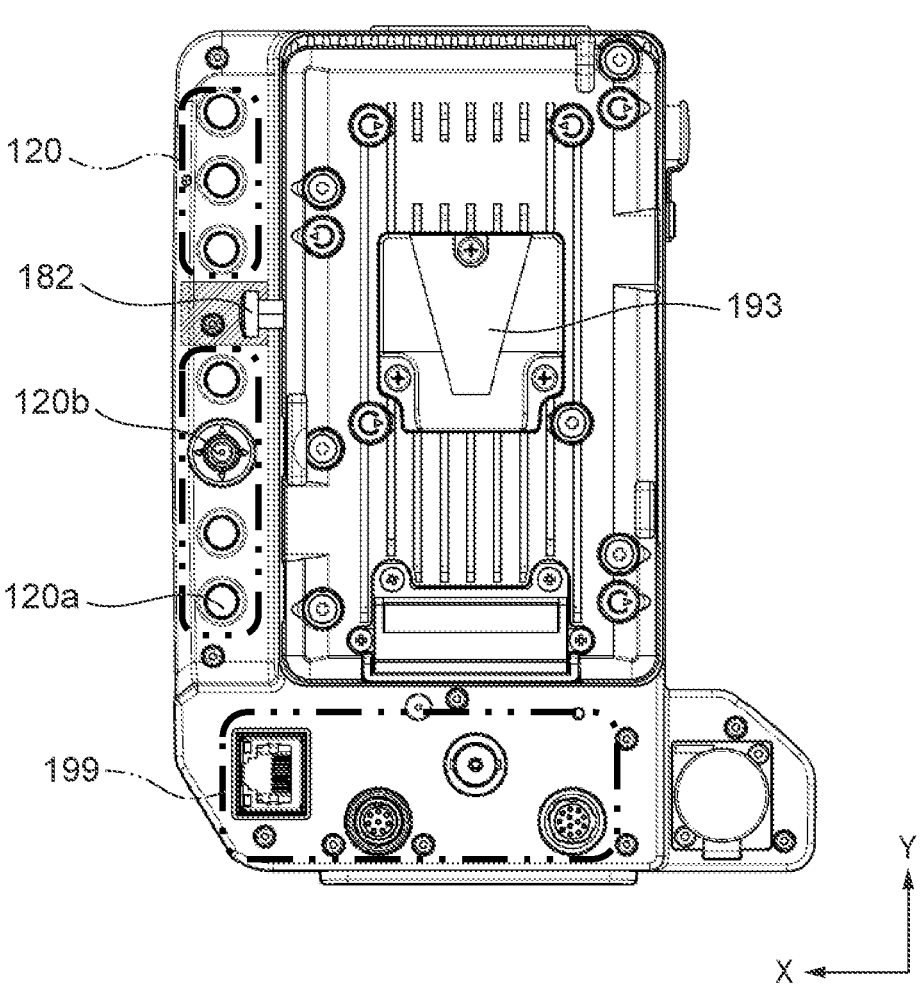
FIG. 6 is a rear view of the expansion unit when viewed from a minus Z-axis direction.
Figure 7:
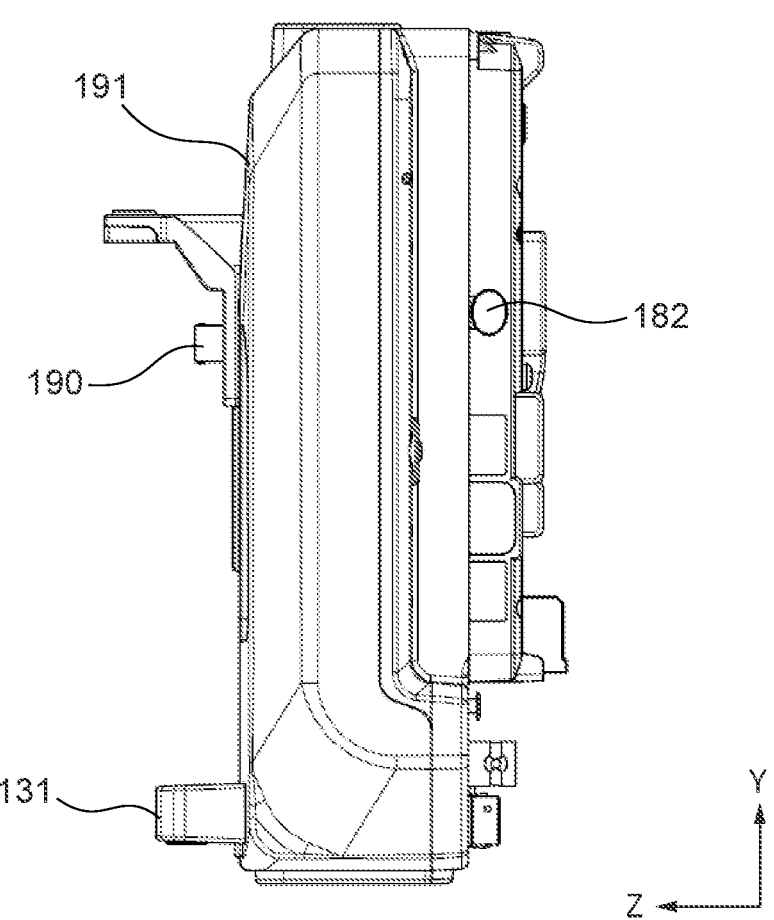
FIG. 7 is a right side view of the expansion unit when viewed from a plus X-axis direction.

FIG. 5 is a perspective view of the expansion unit 150 when viewed from the rear upper side, FIG. 6 is a rear view of the expansion unit 150 when viewed from the minus Z-axis direction, and FIG. 7 is a right side view of the expansion unit 150 when viewed from the plus X-axis direction. Furthermore, FIG. 8 is a bottom view of the expansion unit 150 when viewed from a minus Y-axis direction, and FIG. 9 is a top view of the expansion unit 150 when viewed from the plus Y-axis direction.

Figure 8:
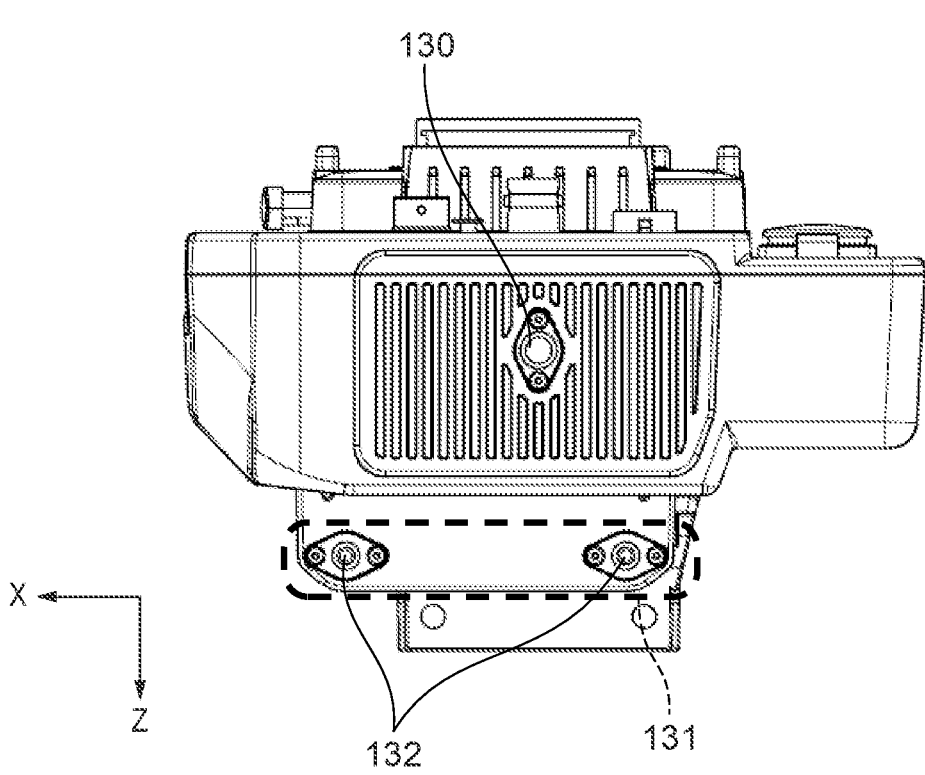
FIG. 8 is a bottom view of the expansion unit when viewed from a minus Y-axis direction.
Figure 9:
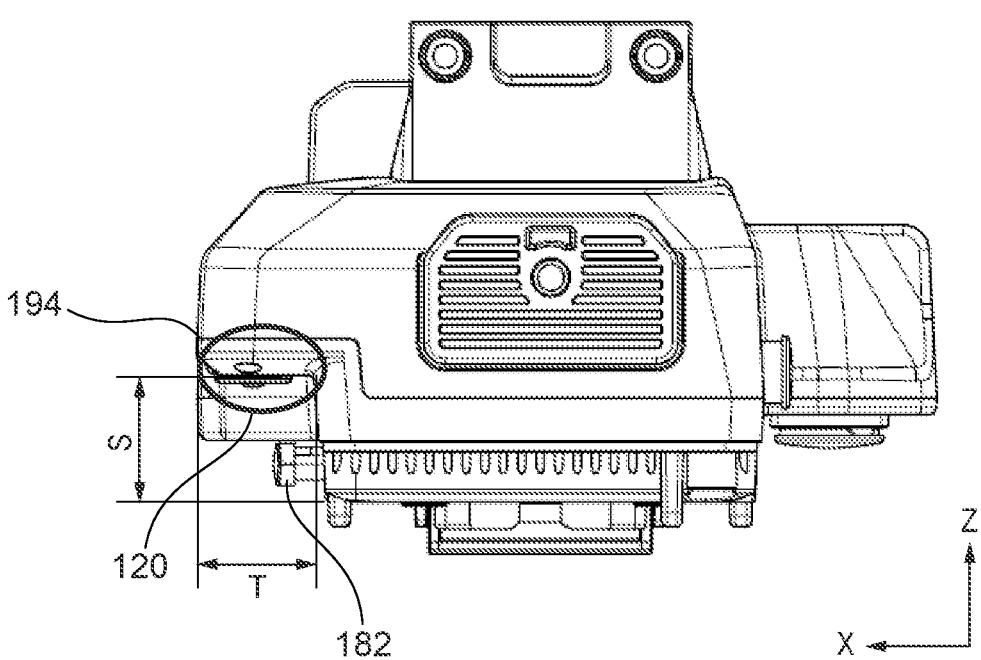
FIG. 9 is a top view of the expansion unit when viewed from a plus Y-axis direction.

As shown in FIG. 8, the bottom surface of the expansion unit 150 is provided with a tripod screw portion 130, and an insertion portion 131 that is provided with fixing screw portions 132 at both ends.

As shown in FIG. 5, the external appearance of the expansion unit 150 is configured by a front cover 191, a rear cover 192, and a battery attachment portion 193. Further, as shown in FIG. 7, the contact connector 190 is provided on the front surface of the expansion unit 150. The contact connector 190 is configured to protrude forward from an opening (not shown) of the front cover 191.

As shown in FIG. 6, an operation portion 120, which is used to operate the image pickup apparatus main body 101, is provided on the rear surface of the expansion unit 150. The operation portion 120 is a menu-related operation portion, in which a plurality of operation switches are disposed substantially on the same plane, and includes a menu button 120a and a cross key 120b.

The menu button 120a is a button that has a function equivalent to that of the main body side menu button 202a, and the user is able to access the menu mode for performing various kinds of settings of the image pickup apparatus main body 101 by operating the menu button 120a.

The cross key 120b is a key that has a function equivalent to that of the main body side cross key 202b, and by operating the cross key 120b, the user is able to perform moving to select the item in the menu mode and make the selection decision by center push. In this way, the operation portion 120 has the same operation method as the main body rear operation portion 202.

Figure 10:
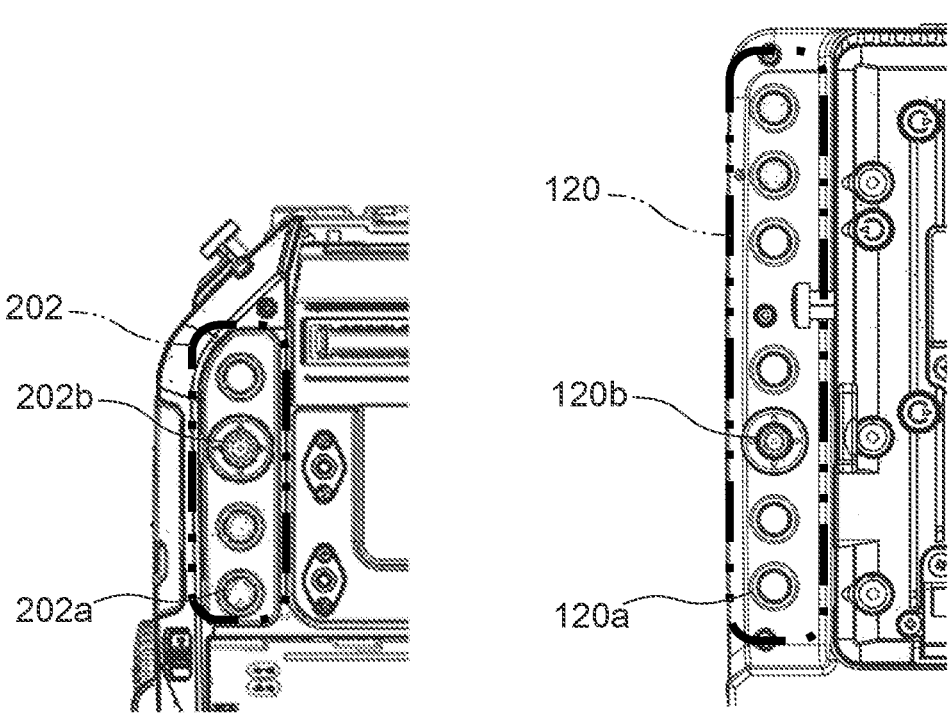
FIG. 10 is a comparison view of an operation portion of the expansion unit and a main body rear operation portion provided on the image pickup apparatus main body.

In addition, as shown in FIG. 10, a part of the operation portion 120 is arranged in the same arrangement order as the main body rear operation portion 202.

Here, a positional relationship between the image pickup apparatus main body 101 and the expansion unit 150 in the image pickup system 100 will be described.

As described above, the expansion unit connecting connector 203 of the image pickup apparatus main body 101 is provided on the rear surface of the product. Therefore, the expansion unit connecting connector 203 and the contact connector 190 face each other, and as shown in FIG. 2, the operation portion 120 and the battery attachment portion 193 constitute the rear surface of the image pickup system 100.

In other words, when the expansion unit 150 is attached to the image pickup apparatus main body 101, the main body rear operation portion 202 is covered with the expansion unit 150 and becomes inoperable.

However, in the preferred embodiment of the present invention, as described above, the operation portion 120 has the same function as the main body rear operation portion 202. As a result, in the case that the expansion unit 150 is attached to the image pickup apparatus main body 101, by using the operation portion 120 instead of the main body rear operation portion 202, the user becomes able to perform the same operations as when only the image pickup apparatus main body 101 is used.

Moreover, in the preferred embodiment of the present invention, although the operation portion 120 has a part of the functions of the main body rear operation portion 202, of course, the operation portion 120 may have all the functions of the main body rear operation portion 202.

Figure 11:
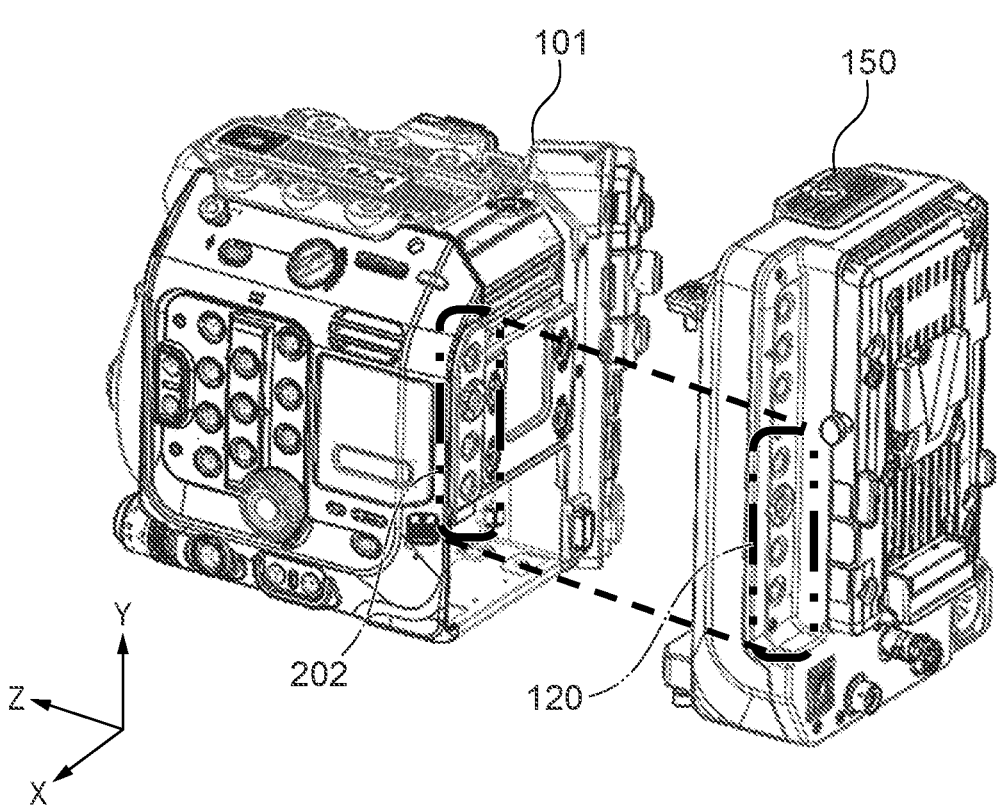
FIG. 11 is an exploded perspective view that shows a positional relationship between the operation portion of the expansion unit and the main body rear operation portion provided on the image pickup apparatus main body.

Here, FIG. 11 shows an exploded perspective view that shows a positional relationship between the main body rear operation portion 202 and the operation portion 120.

As shown in FIG. 11, in the image pickup system 100 according to the preferred embodiment of the present invention, the main body rear operation portion 202 and the operation portion 120 are configured to be located substantially on the same straight line on an axis parallel to the Z-axis.

Figure 12:
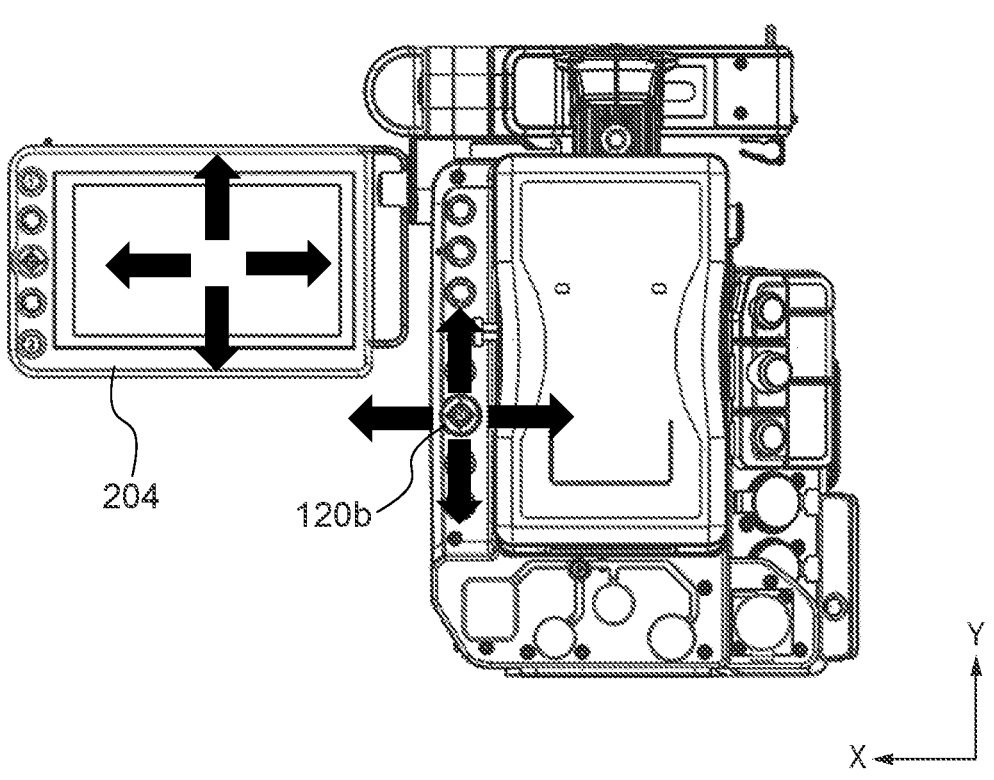
FIG. 12 is a rear view of the image pickup system in a photographing state.

Next, FIG. 12 shows a rear view of the image pickup system 100 in a photographing state.

In the image pickup system 100 according to the preferred embodiment of the present invention, it is assumed that the user performs operations from the rear side of the image pickup system 100. For this reason, it is assumed that a display surface of the monitor 204 attached to the image pickup apparatus main body 101 is also used in a state facing the user so as to provide the best visibility. Therefore, in the case that the user performs the menu operation, as shown in FIG. 12, since the left-right direction and the vertical direction (the X-axis direction and the Y-axis direction) of the monitor 204 coincide with the left-right direction and the vertical direction (the X-axis direction and the Y-axis direction) of the operation portion 120, the user is able to perform the menu operation intuitively, and it is possible to obtain extremely excellent operability.

As described above, in the preferred embodiment of the present invention, not only in the case of using the image pickup apparatus main body 101 as a single device, but also in the case of using the image pickup apparatus main body 101 as the image pickup system 100, the user is able to use the operation system with the same functions and the same operation method, which is disposed at substantially the same position. As a result, there is no change in the usability of the operation system, and in the case that the user performs menu setting, the user no longer has to look for the position of the button or redo the settings due to the wrong operation method, and it is possible to provide the image pickup system 100 as a system with extremely excellent operability.

Here, a method of attaching the expansion unit 150 to the image pickup apparatus main body 101 will be described with reference to FIG. 13, which shows the process of attaching the expansion unit 150 to the image pickup apparatus main body 101.

In the image pickup system 100 according to the preferred embodiment of the present invention, the expansion unit 150 is attached to the image pickup apparatus main body 101 along a locus with a shape along the Z-axis from the rear.

Figure 13:
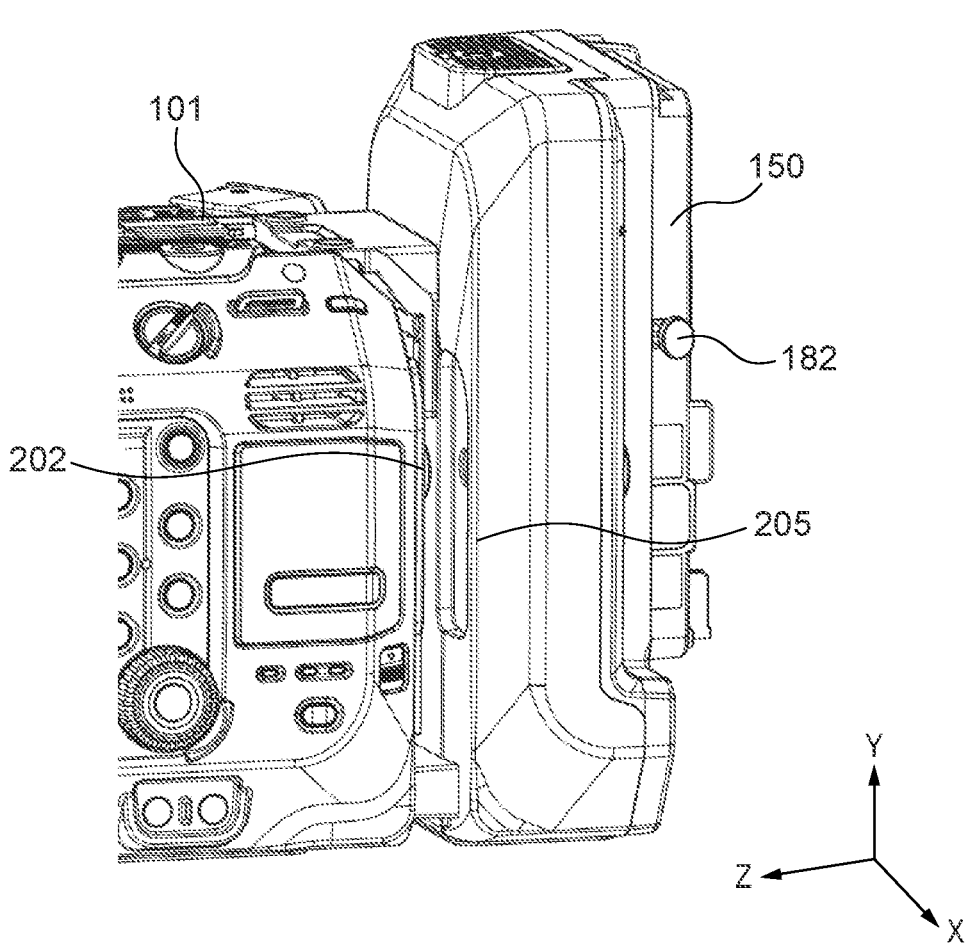
FIG. 13 is a view that shows the process of attaching the expansion unit to the image pickup apparatus main body.

Therefore, as shown in FIG. 13, in order not to interfere with the main body rear operation portion 202, the front surface of the expansion unit 150 is provided with a relief portion 205 that is recessed one step from the external appearance surface thereof.

Since the attachment locus of the expansion unit 150 moves along the Z-axis from the rear side, the relief portion 205 does not need to escape from the operation locus of the main body rear operation portion 202, and the relief portion 205 has a shape that is formed with a minimum relief amount. As a result, it is possible to effectively utilize the space inside the expansion unit 150, and it becomes possible to configure the expansion unit 150 in a small size.

In addition, as shown in FIG. 6, the terminal group 199 having a plurality of input/output terminals is provided on the rear surface of the expansion unit 150, and by connecting cables to these input/output terminals so as to connect external equipment, it is possible to expand the functions of the image pickup apparatus main body 101.

The battery attachment portion 193 (an expansion module attachment portion) for attaching an expansion module such as a large sized expansion module battery 181 having high capacity (see FIG. 5) or an optical fiber unit 185 (see FIGS. 14A and 14B) to the image pickup apparatus main body 101 is provided on the rear surface of the expansion unit 150. Electric power sent from the expansion module battery 181 through the battery attachment portion 193 is used to drive the expansion unit 150, and is also supplied to the image pickup apparatus main body 101 through the contact connector 190 so as to be used to drive the image pickup apparatus main body 101.

The arrangement relationship of the operation portion 120 and the battery attachment portion 193 will be described in detail with reference to FIGS. 6, 7, and 9. The operation portion 120 and the battery attachment portion 193 are arranged to be substantially parallel to the image pickup plane 108 (see FIG. 1B) of the image pickup apparatus main body 101, and are arranged on the rear surface of the expansion unit 150, which is the opposite side of the image pickup plane 108 (the rear surface of the expansion unit 150, which is opposite to the image pickup plane 108).

In addition, a step S (see FIG. 9) is provided between the operation portion 120 and the battery attachment portion 193, the operation portion 120 is closer to the image pickup plane 108 of the image pickup apparatus main body 101 than the battery attachment portion 193, and a relationship of a width T of an arrangement surface of the operation portion 120<the step S is established.

In the case that the user operates the operation portion 120, since the plus X-axis direction is the external appearance side, there is no configuration that prevents the user's finger from entering the arrangement surface of the operation portion 120 from the X-axis direction. Therefore, the width T is a minimum width considering only the switch arrangement of the operation portion 120.

Figure 14A:
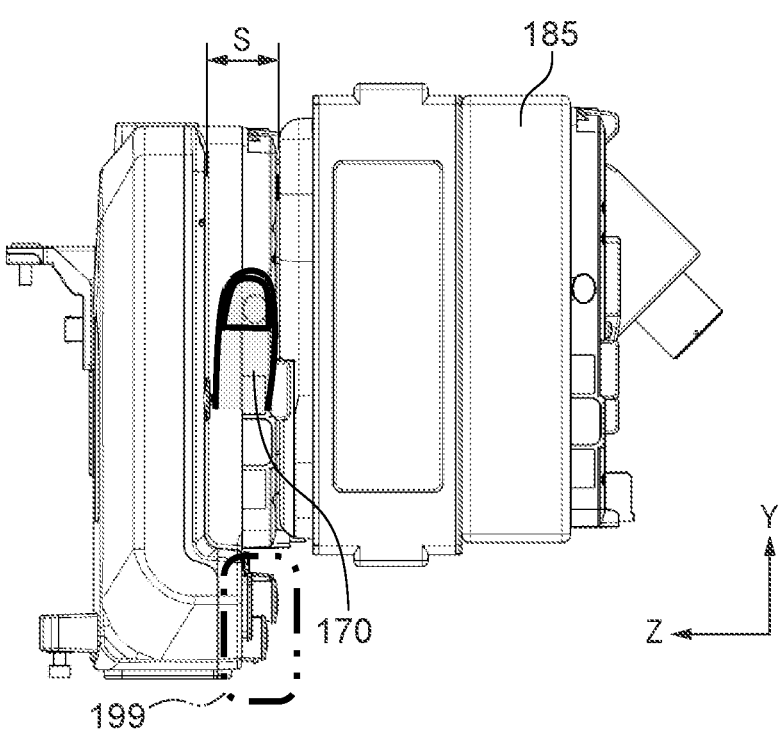
FIGS. 14A and 14B are external appearance perspective views when a large sized optical fiber unit is attached to the expansion unit.
Figure 14B:
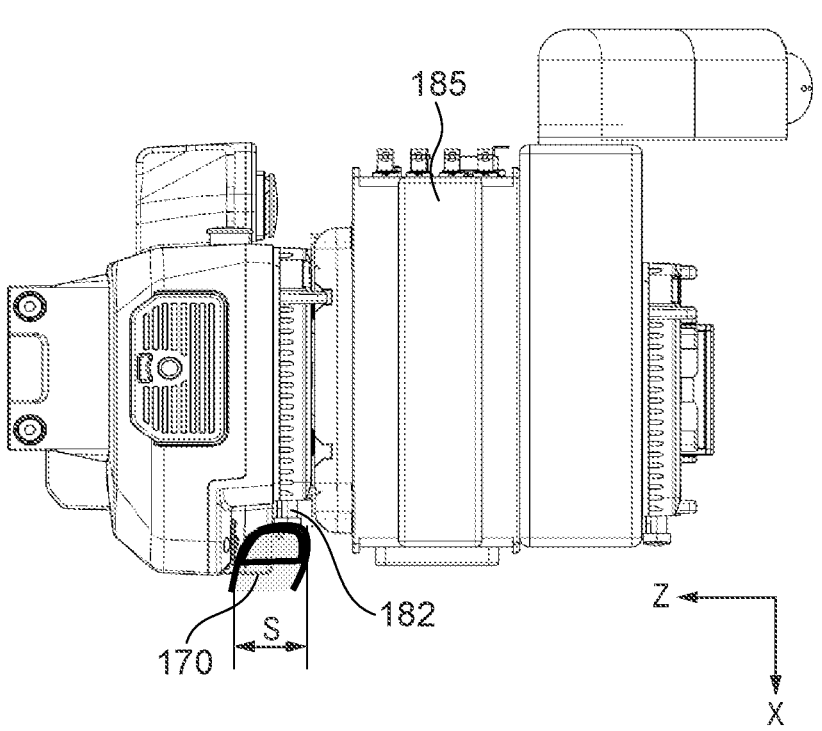

On the other hand, as shown in FIGS. 14A and 14B, in the case that the optical fiber unit 185 or the like is attached to the expansion unit 150, when the operation portion 120 is viewed from the plus Z-axis direction, a portion of the operation portion 120 is blocked. That is, in the case that the user operates the operation portion 120, the user's finger is prevented from entering the arrangement surface of the operation portion 120 from the plus Z-axis direction. Therefore, the size of the step S is set so that a space for the user's finger 170 to enter the part of the operation portion 120 is secured.

That is, as shown in FIGS. 14A and 14B, since there is the step S, even in the case that the optical fiber unit 185 or the like is attached to the expansion unit 150, there is room for the user's finger 170 to enter the step S. Therefore, it becomes easy to operate an attachment/detachment knob 182 (see FIGS. 13 and 14B) provided on an XZ plane, which constitutes the step S in the operation portion 120 and further in the expansion unit 150. Similarly, even in the case of connecting an input/output cable to the terminal group 199 in the plus X-axis direction from the optical fiber unit 185 or the like, since there is the step S, access to the attachment/detachment knob 182 is possible, and the operability will not be impaired.

As shown in FIG. 6, the operation portion 120 is arranged in the plus X-axis direction than the battery attachment portion 193. In addition, the plurality of operation switches of the operation portion 120 are arranged so as to avoid a position (a shaded area in FIG. 6) where the attachment/detachment knob 182 of the expansion module battery 181 provided in the battery attachment portion 193 overlaps with the projection in the Y-axis direction. As a result, in the case that the user operates the expansion unit 150, the attachment/detachment knob 182 will not interfere with the operation of the operation portion 120.

In addition, as shown in FIG. 9, an exterior member 194 on the plus X-axis side of the surface, on which the operation portion 120 is arranged, is farther from an image pickup center than the attachment/detachment knob 182. As a result, even in the case that the expansion unit 150 falls or collides, the exterior member 194 absorbs the impact caused by the fall or the collision, and the attachment/detachment knob 182 can be protected from the impact.

Next, the details of the terminal group 199 described above (see FIG. 6) will be described with reference to FIGS. 15, 16, and 17.

Figure 15:
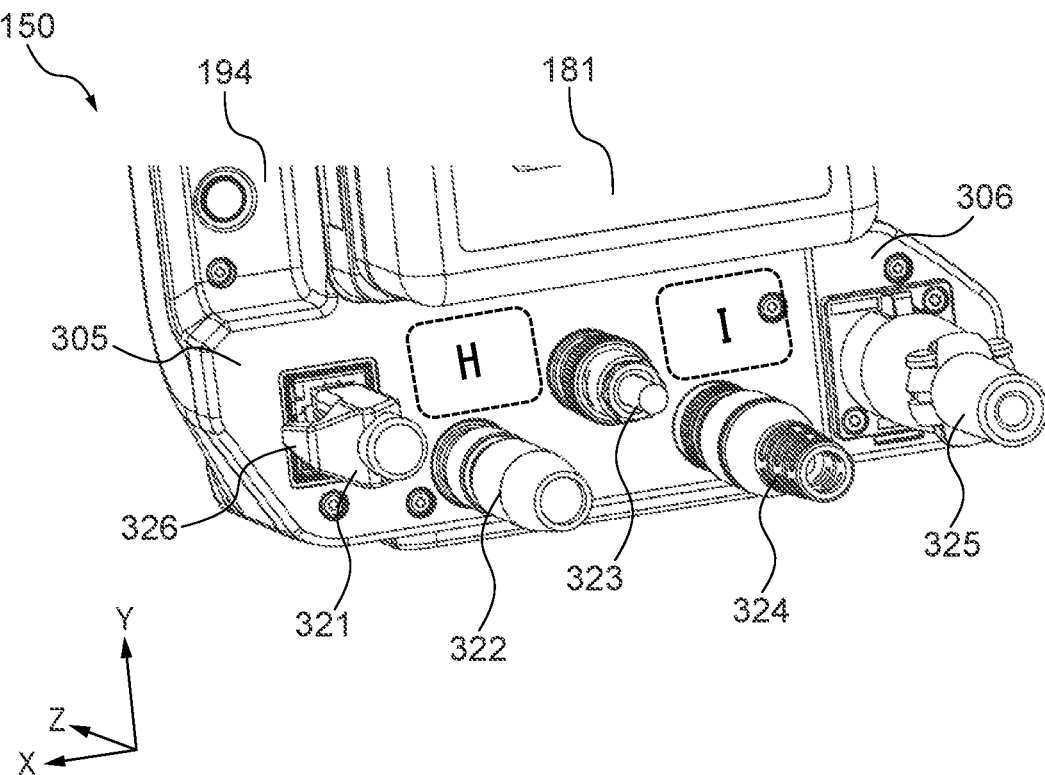
FIG. 15 is a partially enlarged view of the vicinity of a terminal group of the expansion unit shown in FIG. 6 in a state, in which plugs are inserted into the terminal group of the expansion unit.
Figure 16:
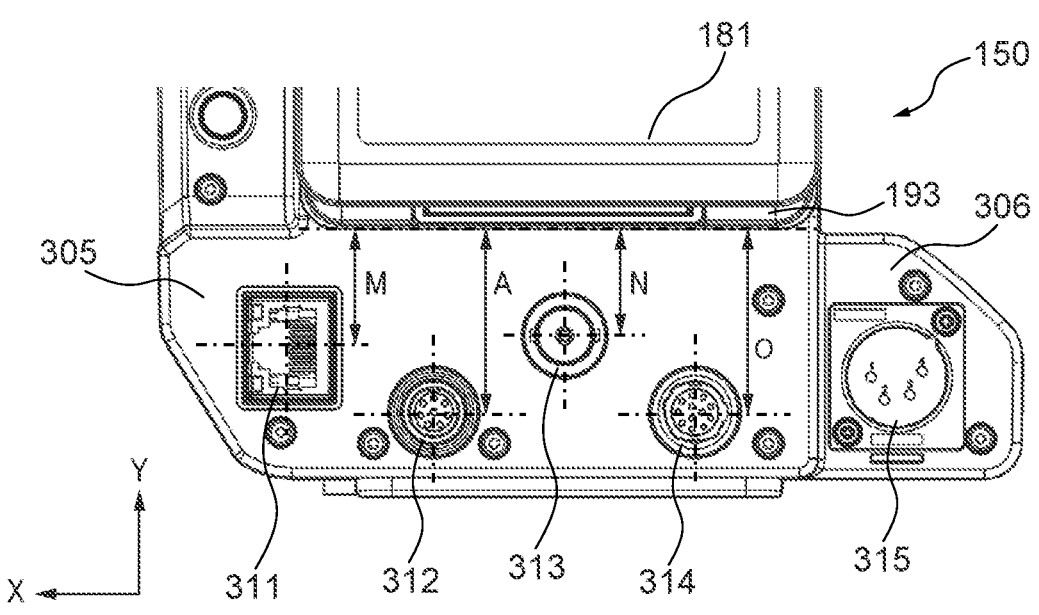
FIG. 16 is a partially enlarged view of the vicinity of the terminal group of the expansion unit shown in FIG. 6 in a state, in which the plugs are not inserted into the terminal group of the expansion unit.

FIG. 15 is a partially enlarged view of the vicinity of the terminal group 199 of the expansion unit 150 in a state, in which plugs are inserted into the terminal group 199. Further, FIG. 16 is a partially enlarged view of the vicinity of the terminal group 199 of the expansion unit 150 in a state, in which the plugs are not inserted into the terminal group 199.

A terminal 311 (see FIG. 16) is an Ethernet terminal that can be connected to a controller (not shown) by inserting a plug 321 (see FIG. 15) and can input the control signals of the image pickup system 100 (see FIGS. 1A and 1B). In addition, the terminal 311 can also be connected to an external network device by inserting the plug 321 and can output video signals.

The terminal 311 is located at the farthest end of the terminal group 199 and is arranged so that a locking knob 326 (an attachment/detachment knob) of the plug 321 faces the outside of the expansion unit 150. This arrangement of the terminals 311 allows the user to easily access the locking knob 326 when inserting or removing the plug 321.

A terminal 312 (see FIG. 16) is a terminal that can be connected to a controller (not shown) by inserting a plug 322 (see FIG. 15) and can input control signals of the image pickup apparatus main body 101.

A terminal 313 (see FIG. 16) is a terminal that can be connected to a video output device (not shown) by inserting a plug 323 (see FIG. 15) and can input video signals.

A terminal 314 (see FIG. 16) is a terminal that can be connected to a servo lens (not shown) by inserting a plug 324 (see FIG. 15) and can supply electric power to the servo lens and communicate with the servo lens.

The terminals 311 to 314 are located on a surface 305 of the exterior member 194, and the surface 305 of the exterior member 194 is below the battery attachment portion 193.

A terminal 315 (see FIG. 16) located on a surface 306 of the exterior member 194 is a terminal that can be connected to a power supply unit (not shown) by inserting a plug 325 (see FIG. 15) and can input electric power. The electric power inputted through the terminal 315 is used to drive the expansion unit 150. In addition, the electric power inputted through the terminal 315 is also supplied to the image pickup apparatus main body 101 (see FIGS. 1A and 1B) through the contact connector 190 (see FIG. 7) so as to be used to drive the image pickup apparatus main body 101.

Next, a positional relationship between the expansion module battery 181 and the terminals 311 to 314 will be described with reference to FIG. 16.

A length M represents a length in the Y-axis direction from the center of the terminal 311 to the battery attachment portion 193, and a length A represents a length in the Y-axis direction from the center of the terminal 312 to the battery attachment portion 193.

A length N represents a length in the Y-axis direction from the center of the terminal 313 to the battery attachment portion 193, and a length O represents a length in the Y-axis direction from the center of the terminal 314 to the battery attachment portion 193.

Here, the length M and the length N are substantially the same, and the length A and the length O are also substantially the same. In other words, the lengths in the Y-axis direction to the battery attachment portion 193 of the two terminals separating from each other in the X-axis direction are substantially the same. In addition, the values of the length M and the length N are different from the values of the length A and the length O. In other words, the lengths in the Y-axis direction to the battery attachment portion 193 of the terminals adjacent to each other in the X-axis direction are different. The reason why the terminals 311 to 314 are arranged in such a positional relationship is to make it easier for the user to attach and detach the plug 321 inserted into the terminal 311, the plug 322 inserted into the terminal 312, the plug 323 inserted into the terminal 313, and the plug 324 inserted into the terminal 314. This will be described by using an example of inserting and removing the plug 323. As described above, since the value of the length N is different from the value of the length A and the value of the length N is different from the value of the length O, as shown in FIG. 15, there is nothing around the terminal 313 that hinders inserting and removing of the plug 323 performed by the user, and a space H surrounded by a dashed line and a space I surrounded by a dashed line are formed. That is, the user is able to easily insert or remove the plug 323 by inserting his/her fingers into the space H and the space I.

In the preferred embodiment of the present invention, although the terminal group 199 is located on the lower side of the battery attachment portion 193, the terminal group 199 may be configured to be located on the right side, the left side, or the upper side of the battery attachment portion 193. However, as shown in FIG. 6, since the operation portion 120 is located on the left side of the battery attachment portion 193, in the case that the terminal group 199 is configured to be located on the left side of the battery attachment portion 193, the terminal group 199 must be configured so as not to hinder the operation of the operation portion 120 performed by the user. In addition, in the case that the terminal group 199 is configured to be located on the upper side of the battery attachment portion 193, since overlapping with an attachment/detachment locus J described below with reference to FIG. 17, it is necessary to attach the expansion module battery 181 to the battery attachment portion 193 before inserting the plug into the terminal group 199.

Next, a positional relationship between the attachment/detachment locus J (an area surrounded by a dashed line) of the expansion module battery 181 and the terminal group 199 will be described with reference to FIG. 17.

Figure 17:
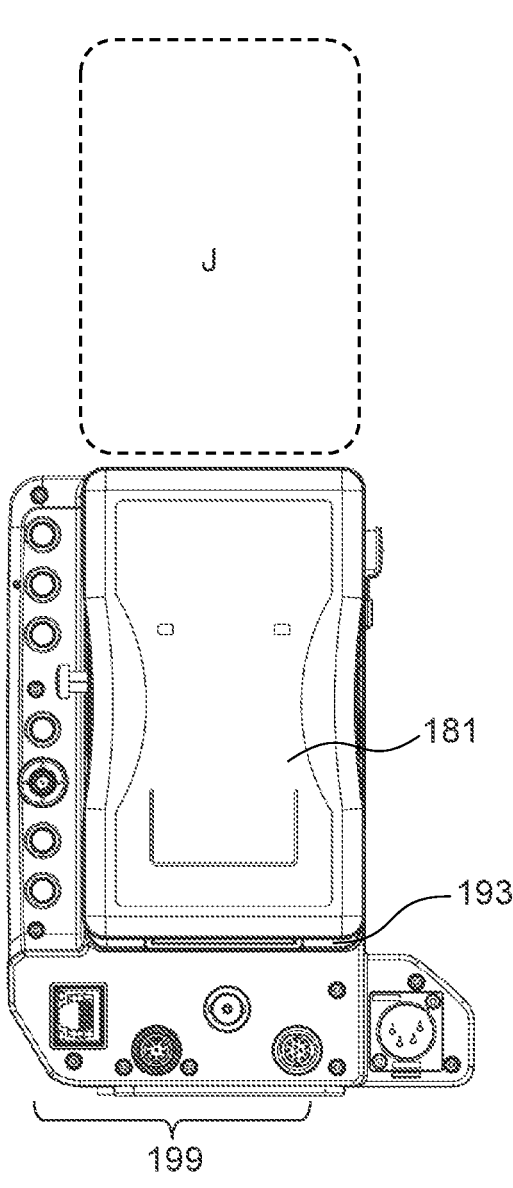
FIG. 17 is a rear view of the expansion unit that shows a state, in which an expansion module battery is attached to a battery attachment portion.
Figure 17:

FIG. 17 is a rear view of the expansion unit 150 that shows a state, in which the expansion module battery 181 is attached to the battery attachment portion 193.

The expansion module battery 181 can be detached from the battery attachment portion 193 by passing through the attachment/detachment locus J in the plus Y-axis direction. On the other hand, in the case of attaching the expansion module battery 181 to the battery attachment portion 193, the expansion module battery 181 can be attached to the battery attachment portion 193 by moving the expansion module battery 181 from the attachment/detachment locus J in the minus Y-axis direction. In this way, the attachment/detachment locus J and the terminal group 199 are located at positions that do not overlap with each other when viewed from the rear projection. Due to this positional relationship, even in the case that the plugs are inserted into the terminal group 199, the expansion module battery 181 can be easily attached to and detached from the battery attachment portion 193.

As described above, since the operation portion 120 is located on the rear surface of the image pickup system 100, a user who performs photographing from behind the image pickup system 100 is able to perform key operations of the operation portion 120 while performing visual observation without moving, and thus the operability is improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-120685, filed on Jul. 28, 2022, which is hereby incorporated by reference herein in its entirety.

What is claimed is:

1. A camera accessory capable of being attached to or detached from an image pickup apparatus main body including an image pickup plane and a camera accessory attachment portion, the camera accessory comprising:

a first connecting terminal configured to perform at least one input or output of video signals, operating power, and control signals with respect to the image pickup apparatus main body; and a second connecting terminal configured to perform at least one input or output of the video signals, the operating power, and the control signals with respect to the outside of the camera accessory, wherein, in a state, in which the camera accessory is attached to the camera accessory attachment portion, an expansion module attachment portion for attaching an expansion module and an operation portion are arranged to be substantially parallel to the image pickup plane and are arranged on a surface opposite to the image pickup plane of the image pickup apparatus main body, wherein a step in an optical axis direction of the image pickup apparatus main body is provided between the expansion module attachment portion and an arrangement surface of the operation portion, and the arrangement surface of the operation portion is closer to the image pickup apparatus main body than the expansion module attachment portion.

2. The camera accessory according to claim 1, wherein in the state, in which the camera accessory is attached to the camera accessory attachment portion, the second connecting terminal is configured to include three or more terminals, which are arranged to be substantially parallel to the image pickup plane and are arranged on the surface opposite to the image pickup plane of the image pickup apparatus main body, and adjacent terminals of the three or more terminals have different distances to the expansion module attachment portion.

3. The camera accessory according to claim 2, wherein the second connecting terminal is arranged at a location that does not overlap an attachment/detachment locus of the expansion module in projection in an optical axis direction of the image pickup apparatus main body.

4. The camera accessory according to claim 3, wherein the second connecting terminal is arranged on a lower side of the expansion module attachment portion.

5. The camera accessory according to claim 4, wherein at least one terminal, into which a plug having a locking knob can be inserted, of the second connecting terminal is located at the end of the three or more terminals and is arranged so that the locking knob faces outward.

6. A camera accessory capable of being attached to or detached from an image pickup apparatus main body including an image pickup plane and a camera accessory attachment portion, the camera accessory comprising:

a first connecting terminal configured to perform at least one input or output of video signals, operating power, and control signals with respect to the image pickup apparatus main body; and a second connecting terminal configured to perform at least one input or output of the video signals, the operating power, and the control signals with respect to the outside of the camera accessory, wherein, in a state, in which the camera accessory is attached to the camera accessory attachment portion, an expansion module attachment portion for attaching an expansion module and an operation portion are arranged to be substantially parallel to the image pickup plane and are arranged on a surface opposite to the image pickup plane of the image pickup apparatus main body, wherein the operation portion includes a plurality of operation switches, and an attachment/detachment knob provided on the expansion module attachment portion and the plurality of operation switches of the operation portion are arranged so as not to overlap each other in projection in an optical axis direction of the image pickup apparatus main body.

7. The camera accessory according to claim 6, wherein with respect to the attachment/detachment knob provided on the expansion module attachment portion, an outer shape of a surface, on which the operation portion is arranged, is away from an optical axis center of the image pickup apparatus main body.

8. The camera accessory according to claim 6, wherein in the state, in which the camera accessory is attached to the camera accessory attachment portion, the second connecting terminal is configured to include three or more terminals, which are arranged to be substantially parallel to the image pickup plane and are arranged on the surface opposite to the image pickup plane of the image pickup apparatus main body, and adjacent terminals of the three or more terminals have different distances to the expansion module attachment portion.

9. The camera accessory according to claim 8, wherein the second connecting terminal is arranged at a location that does not overlap an attachment/detachment locus of the expansion module in projection in an optical axis direction of the image pickup apparatus main body.

10. The camera accessory according to claim 9, wherein the second connecting terminal is arranged on a lower side of the expansion module attachment portion.

11. The camera accessory according to claim 10, wherein at least one terminal, into which a plug having a locking knob can be inserted, of the second connecting terminal is located at the end of the three or more terminals and is arranged so that the locking knob faces outward.

* * * * *